(12) United States Patent
Flener et al.

(10) Patent No.: US 10,272,746 B2
(45) Date of Patent: Apr. 30, 2019

(54) EDGE-ENCAPSULATED PANELS USING HIGH DAMPING FOAM

(75) Inventors: Michael J. Flener, Plymouth, MI (US); Christopher J. Liddiard, Rochester Hills, MI (US)

(73) Assignee: Henkel AG & Co. KGaA, Duesseldorf (DE)

( * ) Notice: Subject to any disclaimer, the term of this patent is extended or adjusted under 35 U.S.C. 154(b) by 0 days.

(21) Appl. No.: 13/040,913

(22) Filed: Mar. 4, 2011

(65) Prior Publication Data

US 2012/0055841 A1 Mar. 8, 2012

Related U.S. Application Data

(63) Continuation of application No. PCT/US2009/055999, filed on Sep. 4, 2009.

(Continued)

(51) Int. Cl.
*B65D 85/30* (2006.01)
*B60J 1/02* (2006.01)
(Continued)

(52) U.S. Cl.
CPC ............... *B60J 1/02* (2013.01); *B60J 1/006* (2013.01); *B60J 1/007* (2013.01); *B60J 10/32* (2016.02);
(Continued)

(58) Field of Classification Search
CPC ...... B60J 1/006; B60J 10/0065; B60J 1/0094; B60J 1/02; B60J 1/0071; B60J 10/32; B60J 10/34; B60J 10/50; B60J 10/70; B60J 1/00; B60J 1/10; B60J 10/04; B60J 10/08; B60J 1/007; E02F 9/16; E05D 15/16
(Continued)

(56) References Cited

U.S. PATENT DOCUMENTS 2,997,334 A * 8/1961 Kramer ............................. 49/40
4,867,660 A * 9/1989 Nagase et al. ................ 425/4 R
(Continued)

FOREIGN PATENT DOCUMENTS

CN 1478676 3/2004
DE 2 302 922 A1 7/1974
(Continued)

OTHER PUBLICATIONS

Supplementary Partial European Search Report Issued for Application No. 09 81 2265.8-1756/2328771; PCT/US2009/055999 dated Aug. 13, 2014.
(Continued)

*Primary Examiner* — Anthony Stashick
*Assistant Examiner* — James M Van Buskirk
(74) *Attorney, Agent, or Firm* — Mary K. Cameron

(57) ABSTRACT

Methods for reducing vibration or noise that is transmitted by or through a relatively thin, flat, rigid sheet of material such as a glass pane (e.g., the windshield of a vehicle) or metal panel are provided, wherein such a panel is provided with a material between the panel and a frame that is capable of causing attenuation of the noise or vibration propagating from the panel to the frame or vice versa. Such an assembly is especially useful for glazing in a vehicle for the purpose of improving acoustic comfort within the vehicle.

24 Claims, 1 Drawing Sheet

Related U.S. Application Data

(60) Provisional application No. 61/094,443, filed on Sep. 5, 2008.

(51) Int. Cl.
*B60J 1/00* (2006.01)
*B60J 10/32* (2016.01)
*B60J 10/34* (2016.01)
*B60J 10/50* (2016.01)
*B60J 10/70* (2016.01)

(52) U.S. Cl.
CPC ............... *B60J 10/34* (2016.02); *B60J 10/50* (2016.02); *B60J 10/70* (2016.02)

(58) Field of Classification Search
USPC ........... 206/586; 525/108; 521/84.1; 49/441, 49/440; 277/921
See application file for complete search history.

(56) References Cited

U.S. PATENT DOCUMENTS

| | | | |
|---|---|---|---|
| 4,894,972 A | | 1/1990 | Endoh et al. |
| 4,987,194 A | | 1/1991 | Maeda et al. |
| 5,038,521 A | * | 8/1991 | Andrzejewski et al. ....... 49/441 |
| 5,358,764 A | * | 10/1994 | Roberts et al. ................. 428/31 |
| 5,529,366 A | * | 6/1996 | Gold ........................ B60J 1/006 296/146.15 |
| 5,635,562 A | | 6/1997 | Malcolm |
| 5,797,714 A | | 8/1998 | Oddenino |
| 5,858,502 A | * | 1/1999 | Tanaka ........................ 428/119 |
| 6,110,985 A | | 8/2000 | Wheeler et al. |
| 6,150,428 A | * | 11/2000 | Hanley et al. ................. 521/135 |
| 6,464,280 B1 | * | 10/2002 | Shibata et al. .................. 296/70 |
| 7,364,221 B2 | | 4/2008 | Tabri et al. |
| 2001/0015034 A1 | | 8/2001 | Omori et al. |
| 2002/0046516 A1 | * | 4/2002 | Kato ........................ B60J 1/10 52/204.53 |
| 2003/0061783 A1 | | 4/2003 | Duncan et al. |
| 2006/0165977 A1 | | 7/2006 | Rehfeld et al. |
| 2006/0182978 A1 | | 8/2006 | Leroy et al. |
| 2006/0284522 A1 | | 12/2006 | Burk et al. |
| 2007/0284916 A1 | | 12/2007 | Charlier |
| 2008/0056505 A1 | | 3/2008 | Rehfeld et al. |
| 2010/0000605 A1 | * | 1/2010 | Comert et al. ................. 136/259 |
| 2010/0011666 A1 | * | 1/2010 | Gandhi .................. B60J 10/244 49/70 |
| 2010/0051747 A1 | * | 3/2010 | Mouton ..................... 244/129.3 |
| 2010/0314813 A1 | * | 12/2010 | Wojtowicki et al. ......... 267/141 |
| 2012/0133179 A1 | | 5/2012 | Baroggi et al. |

FOREIGN PATENT DOCUMENTS

| | | |
|---|---|---|
| DE | 2 326 230 A1 | 12/1974 |
| DE | 297 07 708 U1 | 6/1997 |
| DE | 197 56 899 A1 | 7/1999 |
| DE | 198 51 658 A1 | 1/2000 |
| GB | 230234 | 3/1925 |
| JP | 60 30788 | 2/1985 |
| JP | A-H-02-150314 | 6/1990 |
| JP | 05-270277 | 10/1993 |
| JP | 2000 219047 | 8/2000 |
| JP | 2000 226909 A | 8/2000 |
| JP | 2002 029820 | 1/2002 |
| JP | 2004 107519 | 4/2004 |
| JP | 2005-306066 | 11/2005 |
| JP | 2008-520479 | 6/2008 |
| KR | 2002 0031577 | 5/2002 |
| KR | 2002-0049099 | 6/2002 |
| KR | 1020020049099 A | 6/2002 |
| WO | WO 95/22843 A1 | 8/1995 |
| WO | 2007146726 A2 | 12/2007 |
| WO | WO 2009/036784 A1 | 3/2009 |
| WO | WO 2009036784 A1 * | 3/2009 |
| WO | WO 2010/001222 A2 | 1/2010 |

OTHER PUBLICATIONS

Final Office Action Issued by the Japanese Patent Office for Application No. 2011-526219, dated May 13, 2014 and dispatched May 20, 2014.

Korean Office Action for Korean Patent Application No. 10-2011-7007731 dated Jan. 6, 2016.

International Search Report for PCT/US2009/055999, dated Apr. 19, 2010, 2 pages.

* cited by examiner

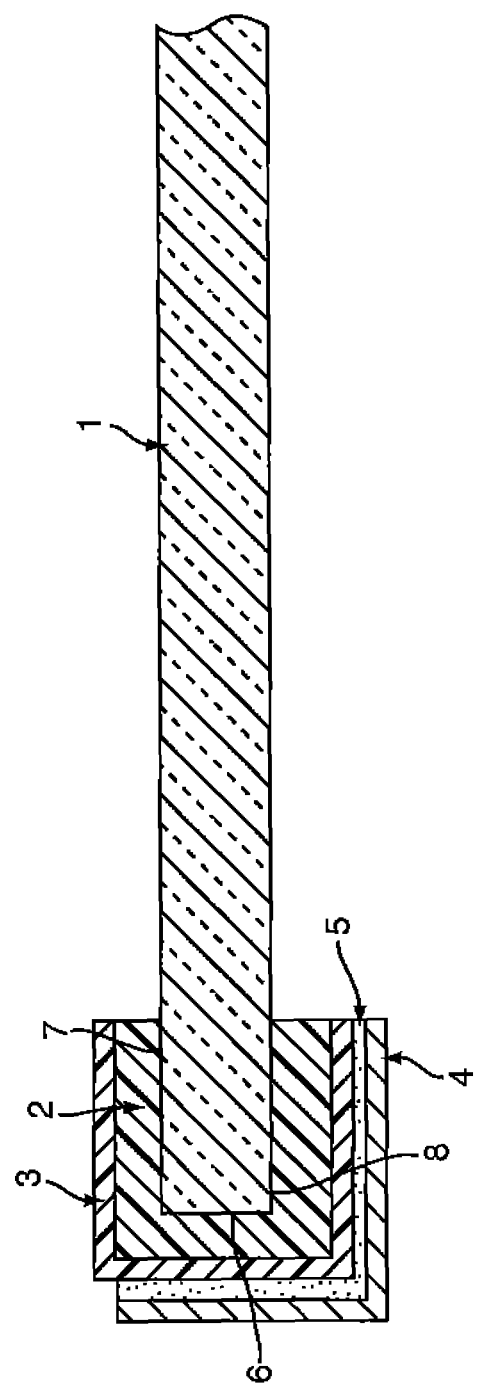

EDGE-ENCAPSULATED PANELS USING
HIGH DAMPING FOAM

This application is a continuation of International Application No. PCT/US2009/055999, filed Sep. 4, 2009 and published on Mar. 11, 2010 as WO 2010/028222, which claims the benefit of U.S. Provisional Application No. 61/094,443 filed Sep. 5, 2008, the contents of each of which are incorporated herein by reference in their entirety.

FIELD OF THE INVENTION

The present invention relates to methods for reducing vibration or noise that is transmitted by or through a relatively thin, flat, rigid panel of material such as a glass pane (e.g., the windshield of a vehicle) or metal or plastic sheet. In particular, the invention pertains to assemblies wherein such a panel is provided with a material between the panel and a frame that is capable of causing attenuation of the noise or vibration propagating from the panel to the frame or vice versa. Such an assembly is especially useful for glazing in a vehicle for the purpose of improving acoustic comfort within the vehicle.

BACKGROUND OF THE RELATED ART

Panels that are relatively flat and thin tend to be susceptible to transmitting or even generating vibration or noise and it has long been recognized that damping such noise or vibration would be desirable in many applications. For example, considerable attention has been devoted to the development of sound-damping strips or elements that can be inserted between two elements (such as a glass sheet and the metal bodywork of a vehicle) in order to cause acoustic attenuation of the noise propagating through at least one of the elements. See, for example, U.S. published applications 2006/0165977; 2006/0182978; 2008/0056505; and 2007/0284916. However, alternative solutions to the problem of panel vibration or noise generation would be desirable, so as to provide a greater range of options to engineers seeking to design assemblies containing such panels.

BRIEF SUMMARY OF THE INVENTION

An assembly is provided by the present invention which comprises a) a panel having at least one edge, b) a carrier, and c) a high damping foam, wherein said edge is at least partially encased by said high damping foam, said high damping foam is at least partially contained by said carrier, said edge preferably does not contact said carrier, and said carrier is adapted to fit into and/or attach to a frame.

The present invention further provides an article of manufacture comprising a) a panel having at least one edge, b) a carrier, c) a high damping foam, and d) a frame, wherein said edge is at least partially encased by said high damping foam, said high damping foam is at least partially contained by said carrier, said edge preferably does not contact said carrier, and said carrier is attached to said frame.

Additionally, the present invention provides a method of making an assembly, said method comprising a) placing an edge of a panel within a carrier containing one or more portions of heat activatable expandable resin and b) heating said one or more portions of heat activatable expandable resin under conditions effective to convert said one or more portions of heat activatable resin to a high damping foam which at least partially encases said edge and which is at least partially contained by said carrier.

A method of making an article of manufacture is also furnished by the present invention, said method comprising a) placing an edge of a panel within a carrier containing one or more portions of heat activatable expandable resin, b) heating said one or more portions of heat activatable expandable resin under conditions effective to convert said one or more portions of heat activatable resin to a high damping foam which at least partially encases said edge and which is at least partially contained by said carrier, thereby forming an assembly, and c) attaching said assembly to a frame using an adhesive and/or one or more mechanical fasteners. Alternatively, an article of manufacture may be prepared by a method comprising a) placing an edge of a panel within a carrier containing one or more portions of heat activatable expandable resin to form an assembly, b) attaching said assembly to a frame using at least one adhesive and/or one or more mechanical fasteners, and c) heating said one or more portions of heat activatable expandable resin under conditions effective to convert said one or more portions of heat activatable resin to a high damping foam which at least partially encases said edge and which is at least partially contained by said carrier.

Additionally provided by the present invention is a method of making an assembly, said method comprising placing an edge of a panel within a carrier containing one or more portions of a high damping foam such that said high damping foam at least partially encases said edge and is at least partially contained by said carrier.

The present invention also provides a method of making an article of manufacture, said method comprising a) placing an edge of a panel within a carrier containing one or more portions of a high damping foam such that said high damping foam at least partially encases said edge and is at least partially contained by said carrier to form an assembly and b) attaching said assembly to a frame using at least one adhesive and/or one or more mechanical fasteners.

A method of making an assembly is further provided herein, said method comprising a) placing an edge of a panel within a recess of a portion of a high damping foam such that said high damping foam at least partially encases said edge and b) placing said portion of said high damping foam within a carrier such that said portion of said high damping foam is at feast partially contained by said carrier. The high damping foam portion having a recess therein may be formed by any suitable method such as extrusion molding or injection molding where a heat activatable expandable material is heated to a temperature or temperatures effective to render the material shapeable and to cause it to expand (foam).

The present invention also furnishes a method of making an article of manufacture, said method comprising a) placing an edge of a panel within a recess of a portion of a high damping foam such that said high damping foam at least partially encases said edge, b) placing said portion of said high damping foam within a carrier such that said portion of said high damping foam is at least partially contained by said carrier to form an assembly, and c) attaching said assembly to a frame using at least one adhesive and/or one or more mechanical fasteners.

A method of making an assembly is additionally provided by the present invention, said method comprising a) placing an edge of a panel within a recess of a portion of a heat activatable expandable resin, b) placing said portion of said heat activatable expandable resin within a carrier, and c) heating said portion of said heat activatable expandable resin under conditions effective to convert said portion of heat activatable resin to a high damping foam which at least partially encases said edge and which is at least partially contained by said carrier.

Still another aspect of the invention relates to a method of making an article of manufacture, said method comprising a) placing an edge of a panel within a recess of a portion of a heat activatable expandable resin, b) placing said portion of said heat activatable expandable resin within a carrier, c) heating said portion of said heat activatable expandable resin under conditions effective to convert said portion of heat activatable resin to a high damping foam which at least partially encases said edge and which is at least partially contained by said carrier, thereby forming an assembly, and d) attaching said assembly to a frame using an adhesive and/or one or more mechanical fasteners.

BRIEF DESCRIPTION OF THE DRAWINGS

FIG. 1 is a fragmentary sectional view of an embodiment of an article of manufacture according to the present invention, in which an assembly comprising a panel, a carrier and a high damping foam is attached to a frame.

DETAILED DESCRIPTION OF CERTAIN EMBODIMENTS OF THE INVENTION

As used herein, the term "high damping foam" means a foam that, at a temperature between −10 and +40° C., has a Young's storage modulus E' between 0.1 MPa and 1000 MPa, preferably a loss modulus E" between 0.5 and 1, a loss factor greater than 0.3 (preferably, greater than 1) and preferably also a shear storage modulus G' between 0.1 MPa and 500 MPa in the frequency range 0 to 500 Hz.

As used herein, the phrase "wherein said edge [of the panel] is at least partially encased by said high damping foam" means that the high damping foam is in contact with at least a portion (preferably all) of the outermost periphery of the panel as well as at least a portion (preferably all) of the peripheral region on each side of the panel proximate to the outermost periphery. In preferred embodiments, the high damping foam does not extend completely across either side of the panel. In one embodiment, a "U" or "C" shaped strip of high damping foam extends continuously around the entire perimeter of the panel, with the edge(s) of the panel extending into the interior of the strip.

The thermally expandable material used to prepare the high damping foam preferably is a material that will foam and expand upon heating but that is typically solid (and preferably dimensionally stable) at room temperature (e.g., 15-30 degrees C.). In some embodiments, the expandable material will be dry and non-tacky, but in other embodiments it will be tacky. The thermally expandable material preferably is formulated such that it is capable of being shaped or moulded (e.g., by injection molding or extrusion) into the desired form for use, such shaping or molding being carried out at a temperature above room temperature that is sufficient to soften or melt the expandable material so that it can be readily processed but below the temperature at which expansion of the expandable material is induced. Cooling the shaped or molded expandable material to room temperature yields a solid having the desired shape or form. Upon activation, e.g., upon being subjected to a temperature of between about 130° C. and 240° C. (depending on the exact formulation of expandable material that is used), the expandable material will typically expand by at least about 50% or at least 100% or at least about 150% or alternatively at least about 200% of its original volume. Even higher expansion rates (e.g., at least about 1000%) may be selected where required by the desired end use. In preferred embodiments, the expandable material is comprised of at least one thermoplastic elastomer and at least one latent (heat activated) blowing agent.

Expansion of the thermally expandable material is achieved by a heating step, wherein the thermally expandable material is heated for a time and at a temperature effective to activate the blowing agent and also any curing agent that may be present.

Depending on the nature of the thermally expandable material, the heating step is typically carried out at a temperature from 130° C. to 240° C., preferably from 150° C. to 200° C., with a residence time in the oven or other article of manufacture used for heating from about 10 min. to about 30 min.

In an especially advantageous embodiment of the invention, the high damping foam is obtained from a thermally expandable material which comprises:

from 25 to 70% by weight, preferably from 35 to 55% by weight, of at least one thermoplastic elastomer (preferably a styrene/butadiene or styrene/isoprene block copolymer or at least partially hydrogenated derivative thereof);

from 15 to 40% by weight, preferably from 20 to 35% by weight, of at least one non-elastomeric thermoplastic (preferably an ethylene/vinyl acetate or ethylene/methyl acrylate copolymer);

from 0.01 to 2% by weight, preferably from 0.05 to 1% by weight of at least one stabilizer or antioxidant;

from 2 to 15% by weight of at least one blowing agent, preferably an amount effective to cause the expandable material to expand at least 100% in volume when heated at a temperature of 150 degrees C.;

from 0.5 to 4% by weight of one or more curing agents, optionally including from 0.5 to 2% by weight of at least one olefinically unsaturated monomer or oligomer, and optionally up to 10% by weight (e.g., 0.1 to 10% by weight) of at least one tackifying resin;

up to 5% by weight (e.g., 0.1 to 5% by weight) of at least one plasticizer;

up to 10% by weight (e.g., 0.1 to 10% by weight) of at least one wax;

up to 3% by weight (e.g., 0.05 to 3% by weight) of at least one activator for the blowing agent;

as well as optionally at least one filler (although the amount of filler is preferably less than 10% by weight, more preferably less than 5% by weight), the percentages being expressed as weight percentages of the total weight of the thermally expandable material.

Such thermally expandable materials are described in more detail in U.S. Pat. No. 7,364,221, incorporated herein by reference in its entirety.

The foam vibration damping materials described in U.S. Pat. No. 6,110,958 (incorporated herein by reference in its entirety) may also be adapted for use as the high damping foam component of the present invention. Such foam vibration damping material is provided from a thermally expandable material comprising 1-20 weight percent elastomeric polymer, 20-60 weight percent thermoplastic polymer, 0.5-18 weight percent tackifier, 4-23 weight percent asphalt filler, 20-50 weight percent inorganic filler and 0.2-7 weight percent blowing agent. The elastomeric polymer may be a rubber such as a styrene-butadiene copolymer or styrene isoprene rubber, especially polystyrene/polyisoprene tri-block copolymers, e.g., styrene-isoprene-styrene (S-I-S)

block copolymer. The thermoplastic polymer may be selected from, e.g., ethylene vinyl acetate (EVA) copolymers and ethylene methyl acrylate copolymers.

U.S. Pat. No. 5,635,562 (incorporated herein by reference in its entirety) also teaches expandable vibration damping material compositions that can be adapted to prepare the high damping foam component of the present invention. Such compositions comprise an elastomeric polymer, plasticizer, thermoplastic polymer, foaming agent, adhesion promoters and filler and may also comprise epoxy curing agents. The elastomeric polymer may be a tri-block copolymer including polystyrene blocks and polyisoprene blocks. The thermoplastic polymer may be selected from ethylene-vinyl acetate copolymers, acrylics, polyethylenes and polypropylenes.

In yet another particularly advantageous embodiment of the present invention, the high damping foam is derived by activation of a thermally expandable material comprising:
a) from 3 to 40% by weight of a first thermoplastic elastomer having a first glass transition temperature;
b) from 3 to 40% by weight of a second thermoplastic elastomer having a second glass transition temperature, wherein the first and the second glass transition temperature differ by at least 10° C.;
c) from 5 to 50% by weight of at least one thermoplastic polymer selected from the group consisting of polymers and copolymers with at least one polymerizable C=C double bond;
d) from 0 to 30% by weight of at least one tackifying resin; and
e) at least one latent chemical blowing agent in an amount effective to cause the expandable material to expand at least 50% in volume when heated at a temperature of 150° C. for at least 20 minutes;
wherein the sum of components a) to e) is less than 100% by weight, and the remainder to 100% by weight is made up of further components or adjuvants. Such thermally expandable materials are described in detail in International patent application PCT/EP2007/008141, filed 19 Sep. 2007 (not yet published), incorporated herein by reference in its entirety.

Preferably, the first thermoplastic elastomer a) and/or the second thermoplastic elastomer b) is selected from the group consisting of thermoplastic polyurethanes, styrene/butadiene block copolymers, hydrogenated styrene/butadiene block copolymers, styrene/isoprene block copolymers, and hydrogenated styrene/isoprene block copolymers. Especially, components a) and b) are selected from styrene/isoprene/styrene tri-block copolymers (SIS), and hydrogenated styrene/isoprene/styrene tri-block copolymers.

Especially efficient damping properties in the temperature range between about 0° C. and about 30° C. are obtained if the first thermoplastic elastomer a) has a glass transition temperature in the range from –25 to 0.0° C., preferably from –20 to –5° C. and/or if the second thermoplastic elastomer b) has a glass transition temperature in the range from 0.1 to 30° C., preferably from 4 to 20° C. Most preferably, the first thermoplastic elastomer a) has a glass transition temperature in the range from –15 to –10° C. and/or the second thermoplastic elastomer b) has a glass transition temperature in the range from 5 to 15° C.

The thermoplastic elastomers a) and b) are preferably both selected from the group consisting of styrene/isoprene/styrene (SIS) tri-block copolymers and hydrogenated styrene/isoprene/styrene tri-block copolymers. The non-hydrogenated tri-block copolymers are especially preferred. The styrene content is preferably in the range of 15 to 25% by weight, more preferably in the range of 19 to 21% by weight. Especially suitable block copolymers include styrene/isoprene/styrene triblock polymers, as well as fully or partially hydrogenated derivatives thereof, in which the polyisoprene block contains a relatively high proportion of monomer moieties derived from isoprene having a 1,2 and/or 3,4 configuration. Preferably, at least about 50% of the polymerized isoprene monomer moieties have 1,2 and/or 3,4 configurations, with the remainder of the isoprene moieties having a 1,4 configuration. This microstructure is believed to contribute to the good dampening properties. Such block copolymers are available from Kuraray Co., Ltd. under the trademark HYBRAR and may also be prepared using the methods described in U.S. Pat. No. 4,987,194, incorporated herein by reference in its entirety. Suitable materials are: Hybrar® 5127 for the thermoplastic elastomer a), and Hybrar® 5125 for the thermoplastic elastomer b).

Component c) improves the processability, especially the extrusion behavior of the thermally expandable material. The presence of a C=C double bond (or a corresponding triple bond which is deemed to be equivalent to a double bond in this respect) is essential for the curing behavior of this component. Polymers or co-polymers with vinyl acetate or (meth)acrylate units are preferred. More preferably, at least one thermoplastic polymer c) is selected from the group consisting of ethylene/vinyl acetate copolymers and ethylene/methyl acrylate copolymers. An ethylene/vinyl acetate copolymer is preferred which has a vinyl acetate content in the range of 24 to 32 mole-%, more preferably in the range of 27 to 29 mole-%.

Preferably, the thermally expandable material comprises at least one tackifying resin d) which is preferably present in an amount of from 1 to 20% by weight. The tackifying resin d) may be selected within the group consisting of rosin resins, terpene resins, terpene phenolic resins, hydrocarbon resins derived from cracked petroleum distillates, aromatic tackifying resins, tall oil resins, ketone resins and aldehyde resins. Suitable rosin resins are abietic acid, levopimaric acid, neoabietic acid, dextropimaric acid, palustric acid, alkyl esters of the aforementioned rosin acids, and hydrogenation products of rosin acid derivatives. Preferably, it is selected from aliphatic hydrocarbon resins. The molecular weight (number average) may be in the range of 1000 to 2000. The softening point (measured according to ASTM D-6090-97) may be in the range of 95 to 105° C. A suitable material is Escorez® 1102 (sold by ExxonMobil).

The thermally expandable material may be pre-cured or cured before blowing ("foaming") by irradiation with actinic radiation, e.g. by visible or UV light, or gamma or electron radiation. In addition to or instead of this physical curing step, the material may be cured by at least one chemical curing agent, which is present in the material as an additional component f). Suitable curing agents include substances capable of inducing free radical reactions, for example organic peroxides including ketone peroxides, diacyl peroxides, peresters, perketals, hydroperoxides and others such as cumene hydroperoxide, bis(tert-butylperoxy) diisopropyl benzene, di(–2-tert-butyl peroxyisopropyl benzene), 1,1-di-tert-butylperoxy-3,3,5-trimethylcyclohexane, dicumyl peroxide, t-butylperoxy-benzoate, di-alkyl peroxydicarbonates, di-peroxyketals (such as 1,1-d i-tert-butylperoxy-3,3,5-trimethylcyclohexane), ketone peroxides (e.g., methylethylketone peroxide), and 4,4-di-tert-butylperoxy n-butyl valerate.

However, curing agents based on sulphur and/or sulphur compounds are preferred, as they lead to several advantages: "overburning" at temperatures above about 200° C. or at prolonged curing times in the paint bake oven at line stops is reduced, higher expansion rates are obtained, and the loss factor tan d becomes nearly independent from the curing temperature. For these reasons it is preferred that the thermally expandable material contains at least one chemical curing agent f) based on sulphur and/or sulphur compounds, preferably a mixture of elemental sulphur and at least one organic di- or polysulfide. The preferred organic sulfide is tetramethylthiuram disulfide.

The curing agent can be a latent curing agent, that is, a curing agent that is essentially inert or non-reactive at room temperature but is activated by heating to an elevated temperature (for example, a temperature within the range of from about 130 degrees C. to about 240 degrees C.).

In various embodiments of the present invention, at least one of the following conditions is met for the relative amounts of the components:

component a) is present in an amount of from 5 to 20% by weight, preferably from 8 to 16% by weight;
component b) is present in an amount of from 15 to 40% by weight, preferably from 20 to 35% by weight;
component c) is present in an amount of from 10 to 25% by weight, preferably from 12 to 20% by weight;
component d) is present in an amount of from 2 to 10% by weight, preferably from 3 to 8% by weight;
component e) is present in an amount of from 1 to 20% by weight, preferably from 2 to 10% by weight;
a chemical curing agent f) is present in an amount of from 0.2 to 5% by weight, preferably from 0.7 to 2% by weight, wherein the sum of components a) to f) is less than 100% by weight, and the remainder to 100% by weight is made up of further components or adjuvants.

In one embodiment, the present invention utilizes a high damping foam obtained from a thermally expandable material comprising:

a) from 5 to 20% by weight of a first thermoplastic elastomer selected from the group consisting of thermoplastic polyurethanes, styrene/butadiene block copolymers, hydrogenated styrene/butadiene block copolymers, styrene/isoprene block copolymers, and hydrogenated styrene/isoprene block copolymers, which has a glass transition temperature in the range from −25 to 0.0° C.,
b) from 15 to 40% by weight of a second thermoplastic elastomer selected from the group consisting of thermoplastic polyurethanes, styrene/butadiene block copolymers, hydrogenated styrene/butadiene block copolymers, styrene/isoprene block copolymers, and hydrogenated styrene/isoprene block copolymers, which has a glass transition temperature in the range from 0.1 to 30° C.,
c) from 10 to 25% by weight of at least one thermoplastic polymer selected from the group consisting of ethylene/vinyl acetate copolymers and ethylene/methyl acrylate copolymers,
d) from 2 to 10% by weight of at least one tackifying resin,
e) at least one latent chemical blowing agent in an amount effective to cause the expandable material to expand at least 50% in volume, preferably at least 100% in volume when heated at a temperature of 150° C. for at least 20 minutes,
f) from 0.5 to 4% by weight of at least one curing agent based on sulphur and/or sulphur compounds,
wherein the sum of components a) to f) is less than 100% by weight, and the remainder to 100% by weight is made up of further components or adjuvants.

All known blowing agents, such as "chemical blowing agents" which liberate gases by decomposition or "physical blowing agents", i.e., expanding hollow beads (also sometimes referred to as expandable microspheres), are suitable as blowing agent e). Mixtures of different blowing agents may be used to advantage; for example, a blowing agent having a relatively low activation temperature may be used in combination with a blowing agent having a relatively high activation temperature.

Examples of "chemical blowing agents" include azo, hydrazide, nitroso and carbazide compounds such as azobisisobutyronitrile, azodicarbonamide, di-nitroso-pentamethylene-tetramine, 4,4'-oxybis(benzenesulfonic acid hydrazide), diphenyl-sulfone-3,3'-disulfo-hydrazide, benzene-1,3-disulfohydrazide and p-toluenesulfonyl semicarbazide. An especially preferred blowing agent is azodicarbonamide.

"Chemical blowing agents" may benefit from the presence of additional catalysts or activators such as zinc compounds (e.g., zinc oxide), (modified) ureas and the like.

However, "physical blowing agents" and particularly expandable hollow microbeads (sometimes referred to as microspheres) are also useable. Advantageously, the hollow microbeads are based on polyvinylidene chloride copolymers or acrylonitrile/(meth)acrylate copolymers and contain encapsulated volatile substances such as light hydrocarbons or halogenated hydrocarbons. Suitable expandable hollow microbeads are commercially available, e.g., under the trademarks "Dualite" and "Expancel" respectively, from Pierce & Stevens (now part of Henkel Corporation) or Akzo Nobel, respectively.

The expandable material may also comprise one or more further components or adjuvants, preferably selected from one or more of:

g) from 5 to 40% by weight, especially from 10 to 30% by weight, filler(s);
h) from 2 to 20% by weight, especially from 2 to 10% by weight, plasticize*);
i) from 1 to 5% by weight curing catalyst(s);
k) from 0.05 to 3% by weight anti-oxidant(s) and/or stabilizer(s);
l) from 0.05 to 5% by weight, especially from 0.05 to 3% by weight, accelerator agent(s); and
m) from 1 to 10% by weight, especially from 1 to 5% by weight, urea.

Examples of suitable fillers g) include ground and precipitated chalks, talc, calcium carbonate, carbon black, calcium-magnesium carbonates, barite, clay, mica, and silicate fillers of the aluminum-magnesium-calcium type, such as wollastonite and chlorite. The filler particles may have a particle size in the range of 25 to 250 μm. The total amount of filler may be in the range from 15 to 25% by weight. However, it may also be limited to less than 10% by weight, even less than 5% by weight. In one embodiment, the expandable material contains no filler (defined herein as substantially inorganic particles, such as particles of the materials mentioned above).

Examples of suitable plasticizers h) include C1-10 alkyl esters of dibasic acids (e.g., phthalate esters), diaryl ethers, benzoates of polyalkylene glycols, organic phosphates, and alkylsulfonic acid esters of phenol or cresol. For example, diisononylphthalate may be used as plasticizer.

Zinc oxide, optionally in activated form, is preferably used as the curing catalyst i).

Suitable antioxidants and stabilizers k) include sterically hindered phenols and/or thioethers, sterically hindered aromatic amines and the like. Phenolic anti-oxidants are preferred.

Suitable accelerator agents 1) may be selected from thiazoles and sulfenamides. It is especially preferred to use N—N'-dicyclohexyl-2-benzothiazolesulfenamid in combination with 2-mercaptobenzothiazole.

The special combination of preferred blowing agent, curing agent, curing catalyst and curing accelerators leads to a closed-cell foam after expansion of the material by heating. The preferred selection of polymers a) and b) which are at least partly film-forming also contributes to the formation of a closed-cell foam, as the polymers are stretched without rupture during the foaming process. A closed-cell foam is preferred as it cannot be filled with or penetrated by water.

In certain embodiments of the invention, the components of the thermally expandable material are selected such that the expandable material is free or substantially free of any thermosettable resin such as an epoxy resin (e.g., the expandable material contains less than 5% or less than 1% by weight epoxy resin).

The uncured thermally expandable material can be put into a desired shape by extrusion and cutting, or by injection molding at temperatures in the range of, for example, 60 to 80° C. For shipping purposes it can be extruded (e.g., onto a cold metal tape) and granulated. At the point of use, the granules can be softened again by heating at temperatures in the range of 60 to 80° C. in order to be shaped by extrusion or injection molding.

The panel component of the present invention may be selected from among any of the relatively thin sheet-like materials known in the art such as metal (e.g., steel, aluminum), plastic (e.g., polycarbonate, acrylic) or glass panels. Such panels may be flat or curved. The present invention is particularly useful for attenuating noise or vibration emanating from or transmitted by glass sheets such as those used in vehicle (e.g., windshield) or building (e.g., window) applications. Such panels are typically square or rectangular in shape having four edges, although the invention is not limited to panels of such shape.

The carrier component of the present invention may be made of metal. Preferred metals are steel, particularly galvanized steel, and aluminum. The metal may be pretreated with a conversion coating and/or painted, so as to improve its resistance to corrosion.

The carrier may also be made of a synthetic material, which may optionally be fiber reinforced (e.g., with glass fibers) and/or reinforced with other types of fillers. Preferred synthetic materials are thermoplastic synthetic materials having a low water absorption and dimensionally stable up to at least 180° C. Suitable thermoplastic synthetic materials include, for example, polyamides, polyesters, aromatic polyethers, polyether ketones, and the like. The carrier may alternatively be fabricated from a thermosettable material.

The carrier serves as a support or enclosure for the high damping foam and thus in preferred embodiments of the invention is in the form of a channel which, in cross-section, may be "L"-shaped, "U"-shaped, "C"-shaped or the like. The carrier is open along at least one side so as to allow insertion of an edge of the panel, but preferably is enclosed on its other sides so as to substantially contain the high damping foam. The carrier (together with the high damping foam) may run along the entire periphery of the panel, or along just one edge of the panel (either the full length of the panel edge or a portion thereof), or more than one but fewer than all the edges of the panel. For example, in the embodiment where the panel has four edges, the carrier may be positioned along one, two, three or all four of the edges. More than one carrier component may be positioned along a single edge of the panel (for example, two carrier components could be placed along the panel edge, with a space or gap therebetween). Where the carrier runs along the entire periphery of the panel, individual carrier components can, for convenience, be initially supplied separately and assembled together around the panel.

The thickness of the carrier is not considered particularly critical, but may be selected as needed depending upon the material from which the carrier is constructed and the strength, rigidity, etc. desired or required both before and after assembling the individual components of an article of manufacture in accordance with the present invention. Likewise, the other dimensions of the carrier (e.g., length, width, height) may be varied as desired or necessary to adapt the present invention to particular end-use applications.

The frame into which the assembly comprised of the panel, carrier and high damping foam (or portion(s) of heat activatable expandable material that is a precursor to such high damping foam) is to be attached may be of any suitable configuration capable of receiving and supporting such assembly. For example, the frame may comprise an inner peripheral section of an opening in a vehicle body which generally corresponds in size, shape and conformation to such assembly, where the panel is a transparent plate member such as a windshield. In such an embodiment, the frame is typically constructed of metal, although other materials such as plastic or rubber could also be utilized. The frame may be generally "L"-shaped in cross-section such that the assembly fits down into the opening and is in contact, around at least part of its periphery, with the lower leg of the "L". In other words, a flange may protrude or project into such opening which is able to support the inserted assembly. In one embodiment, such flange is positioned so that the top (outer) surface of the panel is substantially flush with the outermost surface of the vehicle body adjacent to the opening. The assembly may be secured to the frame using any suitable method such as an adhesive (e.g., a structural adhesive) and/or one or more mechanical fasteners such as bolts, clips, screws, brackets, and the like. In at least certain embodiments of the invention, it will be desirable to design the assembly and the manner in which it is mounted into the frame such that a liquid-tight seal is formed between the panel and the frame, through the combination of the high damping foam, carrier, frame and assembly attachment means. Preferably, the resulting article of manufacture (e.g., vehicle body having a glass window or windshield mounted therein) is configured to have an aerodynamic shape to help minimize noise caused by air turbulence when the vehicle is in motion.

One embodiment of the invention is illustrated in FIG. 1, wherein a portion of an article of manufacture in accordance with the invention is shown in cross-section. An edge of a panel 1 is encased by a high damping foam 2, such that end surface 6, peripheral surface 7 and peripheral surface 8 of the panel 1 are in contact with high damping foam 2. High damping foam 2 is in turn contained within channel-shaped carrier 3. Carrier 3 is attached to a frame 4, which in this embodiment has an "L" shape, using an adhesive layer 5. Frame 4 may comprise part of a larger structure, such as the body of an automotive vehicle. This arrangement permits panel 1 to be secured in place to frame 4 such that high damping foam 2 serves to attenuate or dampen any noise or vibration that might otherwise propagate from the panel to the frame or vice versa if the panel were more directly attached to frame 4 using conventional panel attachment methods.

What is claimed is:

1. An assembly comprising a) a panel having a plurality of edges defining an outermost periphery, b) a carrier which is in the form of a U-shaped or C-shaped channel which is open along one side so as to allow insertion of an edge of the panel, but is enclosed on its other sides, and c) a high damping foam obtained from a thermally expandable material comprising from 25 to 70% total by weight of thermoplastic elastomer, wherein all of said outermost periphery and all of the peripheral region on each side of the panel proximate to the outermost periphery is in contact with said high damping foam, said high damping foam is at least partially contained by said carrier, the interior volume of said carrier, other than the volume occupied by said edge of said panel, is filled by said high damping foam, and said carrier is adapted to fit into and/or attach to a frame.

2. The assembly of claim 1, wherein the edge of the panel does not contact the carrier.

3. The assembly of claim 1, wherein said high damping foam is obtained from a thermally expandable material comprising at least one thermoplastic elastomer and at least one latent blowing agent.

4. The assembly of claim 1, wherein said high damping foam is obtained from a thermally expandable material comprising:
  a) from 3 to 40% by weight of a first thermoplastic elastomer having a first glass transition temperature;
  b) from 3 to 40% by weight of a second thermoplastic elastomer having a second glass transition temperature, wherein the first and the second glass transition temperature differ by at least 10° C.;
  c) from 5 to 50% by weight of at least one thermoplastic polymer selected from the group consisting of polymers and copolymers with at least one polymerizable C=C double bond;
  d) from 0 to 30% by weight of at least one tackifying resin;
  e) at least one latent chemical blowing agent in an amount effective to cause the expandable material to expand at least 50% in volume when heated at a temperature of 150° C. for at least 20 minutes;
  wherein the sum of components a) to e) is less than 100% by weight, and the remainder to 100% by weight is made up of further components or adjuvants.

5. The assembly of claim 1, wherein a "U" or "C" shaped strip of the high damping foam extends continuously around the entire perimeter of the panel, with the edges of the panel extending into the interior of the "U" or "C" shaped strip.

6. The assembly of claim 1, wherein the carrier comprises a thermoplastic synthetic material having low water absorption and is dimensionally stable up to at least 180° C.

7. An article of manufacture comprising a) a panel having a plurality of edges defining an outermost periphery, b) a carrier which is in the form of a U-shaped or C-shaped channel which is open along one side so as to allow insertion of an edge of the panel, but is enclosed on its other sides, c) a high damping foam obtained from a thermally expandable material comprising from 25 to 70% total by weight of thermoplastic elastomer, and d) a frame, wherein all of said outermost periphery and all of the peripheral region on each side of the panel proximate to the outermost periphery is in contact with said high damping foam, said high damping foam is at least partially contained by said carrier, the interior volume of said carrier, other than the volume occupied by said edges of said panel, is filled by said high damping foam, and said carrier is attached to said frame by an assembly attachment means, whereby a liquid-tight seal is formed between the panel and the frame through the high damping foam, carrier, frame and assembly attachment means in combination and the high damping foam causes attenuation of noise or vibration propagating from the panel to the frame or from the frame to the panel.

8. The article of manufacture of claim 7, wherein the edge of the panel does not contact the carrier.

9. The article of manufacture of claim 7, wherein said article of manufacture is a vehicle or a component of a vehicle.

10. The article of manufacture of claim 7, wherein said frame is comprised of metal.

11. The article of manufacture of claim 7, wherein said carrier is attached to said frame by an adhesive and/or by one or more mechanical fasteners.

12. The article of manufacture of claim 7, wherein said frame is an inner peripheral section of an opening in a vehicle body.

13. The article of manufacture of claim 7, wherein a "U" or "C" shaped strip of the high damping foam extends continuously around the entire perimeter of the panel, with the edges of the panel extending into the interior of the "U" or "C" shaped strip.

14. A method of making an assembly, said method comprising a) placing an edge of a panel within a carrier containing one or more portions of heat activatable expandable resin and b) heating said one or more portions of heat activatable expandable resin under conditions effective to convert said one or more portions of heat activatable resin to a high damping foam which at least partially encases said edge and which is at least partially contained by said carrier.

15. A method of making an article of manufacture, said method comprising attaching an assembly made according to the method of claim 14 to a frame using at least one adhesive and/or one or more mechanical fasteners.

16. A method of making an article of manufacture, said method comprising a) placing an edge of a panel within a carrier containing one or more portions of heat activatable expandable resin to form an assembly, b) attaching said assembly to a frame using at least one adhesive and/or one or more mechanical fasteners, and c) heating said one or more portions of heat activatable expandable resin under conditions effective to convert said one or more portions of heat activatable resin to a high damping foam which at least partially encases said edge and which is at least partially contained by said carrier.

17. A method of making an assembly, said method comprising placing an edge of a panel within a carrier containing one or more portions of a high damping foam such that said high damping foam at least partially encases said edge and is at least partially contained by said carrier.

18. A method of making an article of manufacture, said method comprising attaching an assembly made according to the method of claim 17 to a frame using at least one adhesive and/or one or more mechanical fasteners.

19. A method of making an assembly, said method comprising a) placing an edge of a panel within a recess of a portion of a high damping foam such that said high damping foam at least partially encases said edge and b) placing said portion of said high damping foam within a carrier such that said portion of said high damping foam is at least partially contained by said carrier.

20. A method of making an article of manufacture, said method comprising attaching an assembly made according to the method of claim 19 to a frame using at least one adhesive and/or one or more mechanical fasteners.

21. A method of making an assembly, said method comprising a) placing an edge of a panel within a recess of a portion of a heat activatable expandable resin, b) placing said portion of said heat activatable expandable resin within a carrier, and c) heating said portion of said heat activatable expandable resin under conditions effective to convert said portion of heat activatable resin to a high damping foam which at least partially encases said edge and which is at least partially contained by said carrier.

22. The method of claim 21, wherein the edge of the panel does not contact the carrier.

23. The method of claim 21, wherein said carrier is channel-shaped.

24. A method of making an article of manufacture, said method comprising attaching an assembly made according to the method of claim 21 to a frame using at least one adhesive and/or one or more mechanical fasteners.

* * * * *

UNITED STATES PATENT AND TRADEMARK OFFICE
CERTIFICATE OF CORRECTION

PATENT NO. : 10,272,746 B2
APPLICATION NO. : 13/040913
DATED : April 30, 2019
INVENTOR(S) : Michael J. Flener and Christopher J. Liddiard Page 1 of 1

It is certified that error appears in the above-identified patent and that said Letters Patent is hereby corrected as shown below:

In the Specification

Column 8, Line 35: Change "plasticize*)" to --plasticizer(s)--

Signed and Sealed this
Twenty-fourth Day of September, 2019

Andrei Iancu
*Director of the United States Patent and Trademark Office*